(12) United States Patent
Hallgren et al.

(10) Patent No.: US 12,007,341 B2
(45) Date of Patent: Jun. 11, 2024

(54) X-RAY BAGGAGE AND PARCEL INSPECTION SYSTEM WITH EFFICIENT THIRD-PARTY IMAGE PROCESSING

(71) Applicant: Battelle Memorial Institute, Columbus, OH (US)

(72) Inventors: Rodney Arthur Hallgren, Philadelphia, PA (US); Michael Ryan Hausler, Egg Harbor Township, NJ (US); Allen Kwame Anderson, San Antonio, TX (US)

(73) Assignee: Battelle Memorial Institute, Columbus, OH (US)

( * ) Notice: Subject to any disclaimer, the term of this patent is extended or adjusted under 35 U.S.C. 154(b) by 162 days.

(21) Appl. No.: 17/579,644

(22) Filed: Jan. 20, 2022

(65) Prior Publication Data

US 2022/0230366 A1     Jul. 21, 2022

Related U.S. Application Data

(60) Provisional application No. 63/139,340, filed on Jan. 20, 2021.

(51) Int. Cl.
*G01N 23/04* (2018.01)
*G01N 23/046* (2018.01)
(Continued)

(52) U.S. Cl.
CPC ............. *G01N 23/10* (2013.01); *G01N 23/04* (2013.01); *G01N 23/046* (2013.01);
(Continued)

(58) Field of Classification Search
CPC .... G01N 23/04; G01N 23/046; G01N 23/083; G01N 23/087; G01N 23/10; G01N 23/18; G01N 2223/04; G01N 2223/1013; G01N 2223/1016; G01N 2223/306; G01N 2223/313; G01N 2223/314;
(Continued)

(56) References Cited

U.S. PATENT DOCUMENTS 5,699,400 A * 12/1997 Lee ...................... G01V 5/0008
378/57
6,947,521 B2 * 9/2005 Wernick ................. G01N 23/20
378/70
(Continued)

OTHER PUBLICATIONS

International Search Report and Written Opinion of International Application No. PCT/US22/15057, dated Sep. 12, 2022, 9 pages.
(Continued)

*Primary Examiner* — Allen C. Ho
(74) *Attorney, Agent, or Firm* — Grossman, Tucker, Perreault & Pfleger PLLC; Donald G. Weiss

(57) ABSTRACT

In an approach to X-ray inspection image display systems, a colorized X-ray inspection image is received comprising a monochrome X-ray inspection image that is colorized in accordance with an X-ray inspection system false colorization scheme. The colorized X-ray inspection image is filtered by performing pixel shading on the colorized X-ray inspection image to generate a custom colorized X-ray inspection image having a custom false colorization scheme that is different from the X-ray inspection system false colorization scheme.

20 Claims, 5 Drawing Sheets

(51) Int. Cl.
*G01N 23/083* (2018.01)
*G01N 23/087* (2018.01)
*G01N 23/10* (2018.01)
*G01V 5/00* (2006.01)
*G06T 11/00* (2006.01)

(52) U.S. Cl.
CPC ......... *G01N 23/083* (2013.01); *G01N 23/087* (2013.01); *G01V 5/0016* (2013.01); *G06T 11/001* (2013.01); *G01N 2223/04* (2013.01); *G01N 2223/306* (2013.01); *G01N 2223/3307* (2013.01); *G01N 2223/401* (2013.01); *G01N 2223/403* (2013.01); *G01N 2223/408* (2013.01); *G01N 2223/639* (2013.01)

(58) Field of Classification Search
CPC ..... G01N 2223/3307; G01N 2223/401; G01N 2223/403; G01N 2223/408; G01N 2223/639; G01V 5/0016; G01V 5/0025; G01V 5/0041; G01V 5/005
USPC ............. 378/10, 51, 53, 54, 57, 58, 62, 98.9
See application file for complete search history.

(56) References Cited

U.S. PATENT DOCUMENTS

| | | | | |
|---|---|---|---|---|
| 8,180,139 B2* | 5/2012 | Basu | ...................... | G06V 20/64 |
| | | | | 378/57 |
| 8,249,316 B2* | 8/2012 | Hu | ........................... | G06T 7/11 |
| | | | | 600/407 |
| 9,355,502 B2* | 5/2016 | Litvin | .................. | G01V 5/0008 |
| 9,786,070 B2* | 10/2017 | Chen | ........................ | G06T 11/20 |
| 10,401,306 B2* | 9/2019 | Li | .......................... | G06T 17/00 |
| 10,697,903 B2 | 6/2020 | Li et al. | | |
| 10,991,101 B2* | 4/2021 | Brada | ....................... | G06T 7/10 |
| 11,182,637 B2* | 11/2021 | Akira | .................... | G06V 10/143 |
| 11,670,036 B2* | 6/2023 | Paglieroni | ............. | G06T 15/005 |
| | | | | 345/424 |
| 2008/0273772 A1 | 11/2008 | Hu et al. | | |
| 2014/0161333 A1 | 6/2014 | Litvin et al. | | |
| 2016/0012647 A1 | 1/2016 | Chen et al. | | |
| 2018/0106733 A1 | 4/2018 | Li et al. | | |
| 2019/0369034 A1 | 12/2019 | Li et al. | | |
| 2020/0333266 A1 | 10/2020 | Li et al. | | |
| 2022/0020203 A1 | 1/2022 | Paglieroni et al. | | |

OTHER PUBLICATIONS

Najle Megherbi et al., "Fully Automatic 3D Threat Image Projection: Application to Densely Cluttered 3D Computed Tomography Baggage Images", https://www.researchgate.net/publication/236884403, Oct. 2012, 8 pages.

Office Action from corresponding U.S. Appl. No. 17/591,939, dated Sep. 7, 2023. 33 pages.

* cited by examiner

```
float MeasureCosTheta(float3 color, float3 basis)
{
    if (length(color) * length(basis) <= 0)
    {
        return 1;
    }
    return dot(color, basis) / (length(color) * length(basis));
}
```

FIGURE 3

```
static float3 organicBasis = float3(0.8211, 0.5144, 0.2473);
static float3 inorganicBasis = float3(0.4687, 0.7778, 0.4188);
static float3 metalBasis = float3(0.3424, 0.4834, 0.0057);
static float3 backgroundBasis = float3(0.5774, 0.5774, 0.5774);

static float4x4 organicMatrix = float4x4(
    float4(0.8641, -0.7942, 0.0936, 122.0913 / 255),
    float4(0.0151, 0.7750, -0.3404, 82.9868 / 255),
    float4(-0.2273, 1.2844, -0.2695, 26.0735 / 255),
    float4(0, 0, 0, 1)
    );

static float4x4 inorganicMatrix = float4x4(
    float4(0.4819, 1.1039, -0.9718, 44.3566 / 255),
    float4(-0.1669, 0.6363, -0.1770, 105.2741 / 255),
    float4(-0.2299, 0.3448, 0.3283, 77.9671 / 255),
    float4(0, 0, 0, 1)
    );

static float4x4 metalMatrix = float4x4(
    float4(0.1593, 0.3582, 0.1560, 46.8981 / 255),
    float4(-0.6937, 0.8771, -0.0663, 99.5569 / 255),
    float4(-0.5302, -0.1475, 0.7867, 100.4032 / 255),
    float4(0, 0, 0, 1)
    );

static float4x4 backgroundMatrix = float4x4(
    float4(0.5374, 0.4621, -0.2200, 42.3487 / 255),
    float4(-0.0542, 1.0017, -0.1824, 49.2511 / 255),
    float4(-0.0882, 0.5446, 0.3558, 36.3432 / 255),
    float4(0, 0, 0, 1)
    );
```

FIGURE 4

```
float maxCosTheta = MeasureCosTheta(color.rgb, organicBasis);
float4 outColor = organic;

float cosTheta = MeasureCosTheta(color.rgb, inorganicBasis);
if (maxCosTheta < cosTheta)
{
    outColor = inorganic;
    maxCosTheta = cosTheta;
} cosTheta = MeasureCosTheta(color.rgb, metalBasis);
if (maxCosTheta < cosTheta)
{
    outColor = metal;
    maxCosTheta = cosTheta;
} cosTheta = MeasureCosTheta(color.rgb, backgroundBasis);
if (maxCosTheta < cosTheta)
{
    outColor = background;
    maxCosTheta = cosTheta;
} return outColor;
```

FIGURE 5

X-RAY BAGGAGE AND PARCEL INSPECTION SYSTEM WITH EFFICIENT THIRD-PARTY IMAGE PROCESSING

BACKGROUND

The following relates to the X-ray inspection system arts, aviation security arts, transportation security arts, building access security arts, and related arts.

X-ray inspection systems are ubiquitous at airports and other transportation hubs, at the entrances of some government buildings, and at other similar locations, where they are used to detect contraband or security threats concealed in baggage, parcels, briefcases, purses, shoes, worn clothing (i.e., scanning a person to detect items concealed in clothing), and other items. An X-ray inspection system includes an X-ray scanner and ancillary hardware such as baggage conveyor belts or the like, and a computer for controlling acquisition and processing of the X-ray images. By way of non-limiting illustration, some examples of such X-ray inspection systems include: the Rapiscan 632DV baggage and parcel inspection system available from Rapiscan Systems, Torrance, CA, USA; and the Hi-Scan 6040aTiX X-ray inspection system available from Smiths Detection, Edgewood, MD, USA.

X-ray inspection systems have evolved as contraband and security threats have become more varied. For example, an X-ray inspection system that detects metal objects previously would have been sufficient to detect a concealed firearm. However, firearms now exist whose principal components are manufactured from plastics or other types of materials that do not present strong contrast in an X-ray image. Indeed, concern that such concealed weapons might evade X-ray inspection has led to prohibition of their manufacture, sale, or transport in the United States as per 18 U.S.C. § 922(p). Likewise, explosives, plastic explosives and some other types of contraband or security threats may not exhibit strong contrast in an X-ray image.

The human element introduces another source of potential error. An X-ray inspection system is usually used as a screening device. An X-ray image of the scanned item or person is displayed and, if the security person stationed at the inspection system identifies anything suspicious in the X-ray image, then it is diverted for manual inspection (e.g., opening the bag, parcel, or other item to visually inspect what is inside, or performing a body search on a person, or so forth). The decision as to whether an item or person is called upon for further inspection is made by the security person stationed at the X-ray inspection system. This security person may be reviewing X-ray images of several items or persons (or more) per minute during peak hours at a busy international airport. This heavy workload can lead to judgment errors in assessing the X-ray images.

To address such concerns, some X-ray inspection systems now employ advanced technologies such as tomographic imaging or dual-channel scanning. In dual-scanning, two different X-ray energies are employed to produce "high energy" and "low energy" images that can be combined in post-acquisition image processing to provide improved sensitivity to certain materials. In addition to advances in the X-ray scanner itself, most commercial X-ray inspection systems include advanced software that processes the raw X-ray image data to produce a colorized image which has false colorization applied using a colorization scheme that is designed to highlight materials of concern, such as metals which are commonly used in firearms. The colorization scheme may additionally or alternatively be designed to improve image contrast for materials used in typical types of contraband or security threats. This can reduce the element of human error by making suspicious items more evident in the colorized X-ray image.

BRIEF SUMMARY

In one illustrative embodiment, an X-ray inspection image display system comprises: one or more processors; one or more non-transitory computer readable storage media; and program instructions stored on the one or more non-transitory computer readable storage media for execution by at least one of the one or more processors. A colorized X-ray inspection image is received comprising a monochrome X-ray inspection image that is colorized in accordance with an X-ray inspection system false colorization scheme. The colorized X-ray inspection image is filtered by performing pixel shading on the colorized X-ray inspection image to generate a custom colorized X-ray inspection image having a custom false colorization scheme that is different from the X-ray inspection system false colorization scheme.

In another illustrative embodiment, a customized X-ray inspection system comprises an X-ray inspection image display system, and an X-ray inspection system including an X-ray scanner and an X-ray inspection system computer programmed to colorize a monochrome X-ray inspection image acquired by the X-ray scanner according to an X-ray inspection system false colorization scheme to generate a colorized X-ray inspection image, where the X-ray inspection image display system and the X-ray inspection system are operatively connected, and the X-ray inspection image display system is configured to receive the colorized X-ray inspection image by instructions that are readable and executable by one or more processors to receive the colorized X-ray inspection image.

In yet another illustrative embodiment, a colorized X-ray inspection image is received comprising a monochrome X-ray inspection image that is colorized in accordance with an X-ray inspection system false colorization scheme. The colorized X-ray inspection image is filtered on an X-ray inspection image display system by performing pixel shading on the colorized X-ray inspection image to generate a custom colorized X-ray inspection image having a custom false colorization scheme that is different from the X-ray inspection system false colorization scheme.

BRIEF DESCRIPTION OF THE DRAWINGS

FIGS. 3, 4, and 5 present HLSL code as described herein.

DETAILED DESCRIPTION

Figure 1:
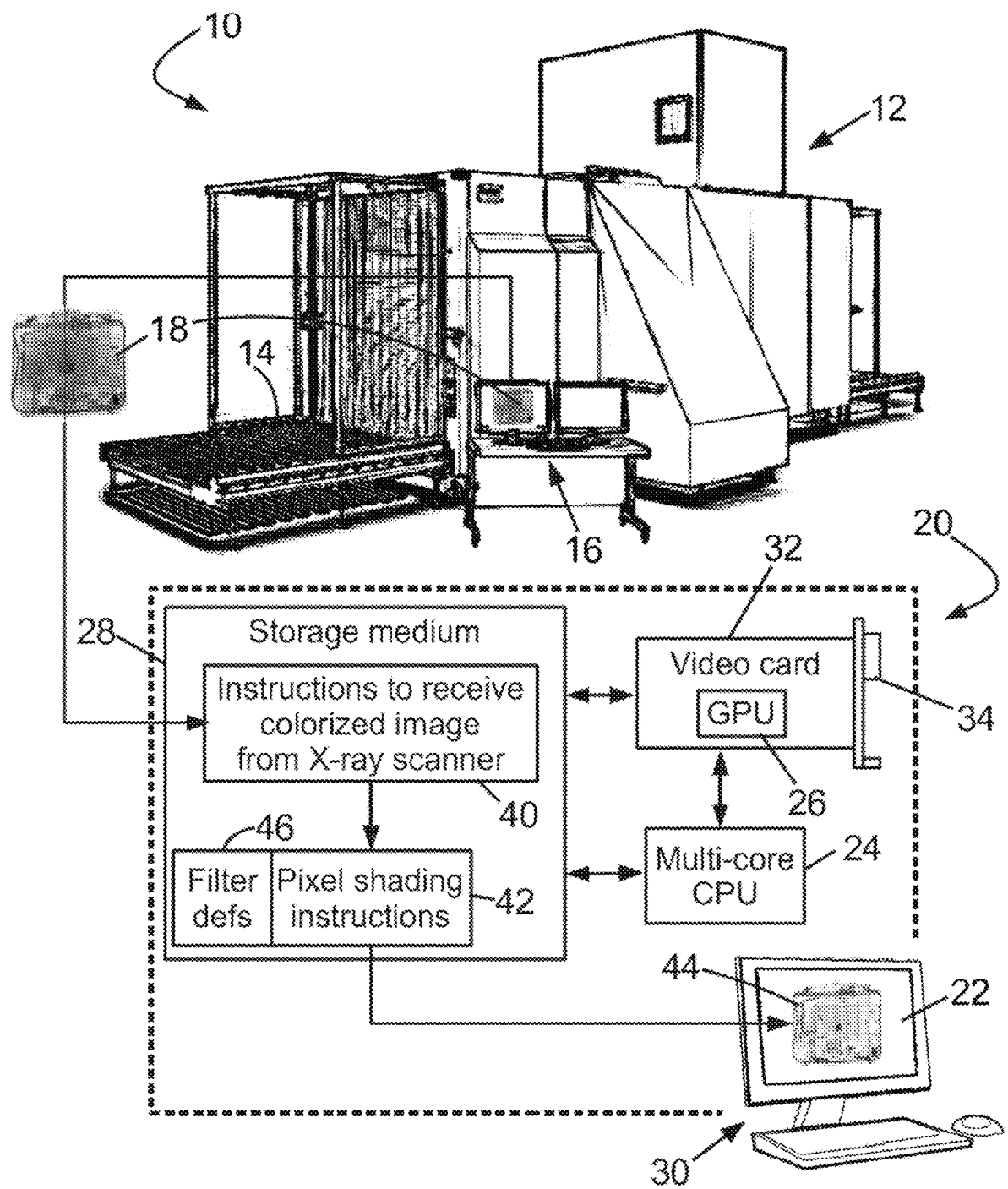
FIG. 1 diagrammatically shows an X-ray inspection system.

When developing a commercial X-ray inspection system providing false colorization of the displayed X-ray image, the design of the colorization scheme typically balances the competing considerations of: (1) avoiding "false negatives", i.e., failure to detect a contraband or security threat item; versus (2) avoiding "false positives", i.e., erroneously detecting an ordinary item as contraband or a threat. False negatives are security concerns, but excessive false positives are also undesirable as they can unduly slow the inspection process leading to passenger delays, missed flights, unhappy customers, and so forth. In balancing these competing considerations, the intended use of the X-ray inspection system may also be taken into consideration. Potentially, the manufacturer may provide different false colorization schemes for different use cases.

Nonetheless, in some instances the false colorization scheme implemented by the X-ray inspection system may be less than optimal for a specific use case. For example, a particular transportation hub or secure facility may anticipate encountering a specific threat or type of contraband that is not well-highlighted by the false colorization scheme implemented by the X-ray inspection system. As another example, a use case in which the volume of items or persons going through the X-ray screening might prefer a more complex colorization scheme that more differentiates a wide range of materials of concern, even if the complex colorization scheme slows down visual review of the X-ray images. By contrast, a use case with high volume of items or persons going through the X-ray screening might prefer a simplified colorization scheme that speeds up the visual review of the X-ray images, even if the simplification of the colorization scheme reduces image contrast for different materials of concern. As yet another example, if a particular type of contraband is not of concern in a use case (for example, because it is permitted to pass in this use case), then it may be desirable for the colorization scheme to not highlight that particular type of contraband.

Furthermore, the specific threats or types of contraband of concern may evolve over time, sometimes quite rapidly. For example, a new type of contraband or security threat may emerge as smugglers or terrorists develop new ways of evading the X-ray inspection, or due to passage of a new law prohibiting transport of an item that was previously permitted. The colorization scheme provided by the X-ray inspection system may be non-optimal for such a changed use case.

One way to address such situations might be to work with the manufacturer of the X-ray inspection system to modify the colorization scheme provided with the X-ray inspection system to be better suited for the specific (or changed) use case. However, cooperative development between customer and manufacturer may not be feasible for economic, commercial, political, or other reasons. In some cases, in which the vendor is a foreign entity, cooperative development may be subject to problematic foreign trade-related regulations. Furthermore, in some instances the customer may be unwilling to divulge the anticipated threat to the X-ray inspection system manufacturer due to information security reasons, or they may be prevented from doing so by governing national security rules.

In view of the foregoing, disclosed herein are X-ray inspection image display systems for displaying a custom colorized X-ray inspection image. The image display system is suitable for implementation as an aftermarket solution that provides a different colorization scheme than that provided by the X-ray inspection system. The X-ray inspection image display system advantageously receives as input a colorized X-ray inspection image generated by an X-ray inspection system. This colorized X-ray inspection image is an acquired monochrome X-ray inspection image that has been colorized in accordance with an X-ray inspection system false colorization scheme that is performed by the X-ray inspection system. (As used herein, the term "monochrome X-ray inspection image" is intended to encompass an X-ray inspection image acquired by a single energy X-ray inspection system, or by dual energy X-ray inspection system. The monochrome X-ray inspection image acquired by a single energy X-ray inspection system is a single monochrome image, i.e., a single channel, or the monochrome X-ray inspection image acquired by a dual energy X-ray inspection system consists of two monochrome images, i.e., two channels, acquired at different X-ray energies). The colorized X-ray inspection image is the usual output of the X-ray inspection system, and hence may be obtainable from the X-ray inspection image as a designed output (e.g., if the X-ray inspection system provides a mechanism for exporting images to a database then the exported image is available), or through a technique such as screen sharing or screen capture (although the image resolution may be reduced in this case if the displayed image is of reduced resolution). Additionally, since security personnel are familiar with reviewing the colorized X-ray inspection image provided by the X-ray inspection system, it may be advantageous to generate the custom colorized X-ray inspection image by performing post-processing on the colorized X-ray inspection image provided by the X-ray inspection system. Additionally, the disclosed X-ray inspection image display systems provide efficient processing to produce the custom colorized X-ray inspection image, enabling it to be used in high workflow level settings such as airport passenger and checked luggage screening.

In a variant embodiment, if the "raw" monochrome X-ray inspection image acquired by the X-ray inspection system is available prior to colorization by the X-ray inspection system, then the image display system may directly process that monochrome X-ray inspection image to produce the custom colorized X-ray inspection image. This approach may provide more flexibility for the custom colorization but requires availability of the raw monochrome X-ray inspection image, which may not be the case for some X-ray inspection systems.

With reference to FIG. 1, an X-ray inspection system 10 includes an X-ray scanner 12, ancillary hardware such as an illustrative baggage conveyor belt 14, and an X-ray inspection system computer 16 that is programmed to colorize a monochrome X-ray inspection image acquired by the X-ray scanner 12 according to the X-ray inspection system false colorization scheme to generate a colorized X-ray inspection image 18. The X-ray inspection system 10 may be a commercial X-ray inspection system such as, by way of non-limiting illustrative example, a Rapiscan 632DV baggage and parcel inspection system (as illustrated) or a Hi-Scan 6040aTiX X-ray inspection system available from Smiths Detection.

An X-ray inspection image display system may include a display and components including one or more processors, where the one or more processors may include one or more central processing units (CPUs), e.g., CPU 24, one or more graphics processing units (GPUs), e.g., GPU 26, or a combination thereof, and one or more non-transitory computer readable storage media. The illustrative X-ray inspection image display system 20 is implemented as a computer 30 including a CPU 24, e.g., an illustrative multi-core CPU 24 although a single-core CPU is also contemplated, and a video card 32 that includes a GPU 26. The video card 32 may optionally also include ancillary hardware such as on-card random access memory (RAM) to temporarily store data (e.g., images) generated by the GPU 26. The video card 32 is installed in an expansion slot of the computer 30 by way of a suitable slot connector 34. The video card 32 is typically used to speed up video processing in tasks such as presenting movie videos or video gaming. Some systems, such as many laptop computers, employ integrated graphics rather than a video card. In these systems, the GPU 26 is included with the CPU 24 on the same integrated circuit (IC) chip.

The non-transitory storage medium 28 can be variously embodied. By way of non-limiting illustrative example, the non-transitory storage medium 28 may be a magnetic hard drive (HD) or solid-state drive (SSD) of the computer 30, an external HD connected with the computer 30, an optical disk loaded into an external or internal optical disk drive of the computer 30, a flash memory, various combinations thereof, and/or so forth. The non-transitory storage medium 28 stores: instructions 40 that are readable and executable by the one or more processors to receive the colorized X-ray inspection image 18 from the X-ray inspection system 10; and pixel shading instructions 42 that are readable and executable by throne or more processors to filter the colorized X-ray inspection image 18 by performing pixel shading on the colorized X-ray inspection image 18 to generate a custom colorized X-ray inspection image 44. Optionally, the non-transitory storage medium 28 may store other information or instructions, such as an operating system for the computer 30 (e.g., a Windows operating system available from Microsoft Corporation, a MacOS operating system available from Apple Corporation, a Linux operating system available from various commercial and non-commercial providers, and/or so forth), other application programs such as word processing, spreadsheet or other office productivity software, and/or so forth. The display 22 is configured by suitable programming (not shown but can comprise any general-purpose image rendering software) of the computer 30 to present the custom colorized X-ray inspection image 44.

As shown, the X-ray inspection image display system 20 is separate from the X-ray inspection system 10. For example, the X-ray inspection system 10 has its X-ray inspection system computer 16 that is separate from the computer 30 implementing the X-ray inspection image display system 20. The instructions 40 that are readable and executable by the one or more processors to receive the colorized X-ray inspection image 18 from the X-ray inspection system 10 can operate in various ways depending on the operative connection between the X-ray inspection system 10 and the computer 30. For example, the colorized X-ray inspection image 18 may be received at the X-ray inspection image display system 20 (e.g., at the computer 30) from the X-ray inspection system 10 via a wired data communication cable (e.g., a USB cable or the like) connecting the X-ray inspection image display system 20 with the X-ray inspection system 10. In another embodiment, the colorized X-ray inspection image 18 may be received at the X-ray inspection image display system 20 from the X-ray inspection system 10 via a wireless data communication channel, such as a Wi-Fi connection or a Bluetooth connection, that wirelessly connects the X-ray inspection image display system 20 with the X-ray inspection system 10. In either of these embodiments, the instructions 40 suitably comprise an application programming interface (API) or other interfacing software that communicates with the X-ray inspection system 10 to request and receive the colorized X-ray inspection image 18 via the wired or wireless connection. In another illustrative embodiment, the colorized X-ray inspection image 18 may be received at the X-ray inspection image display system 20 from the X-ray inspection system 10 via a wireless data communication network (e.g., an airport security network) with which both the X-ray inspection image display system 20 and the X-ray inspection system 10 are wirelessly connected. In this embodiment, the X-ray inspection system 10 may be configured to store the colorized X-ray inspection image 18 in a database hosted on the wireless data communication network (e.g., the database may be implemented by a server computer) and the instructions 40 communicate with the database to retrieve the colorized X-ray inspection image 18 from the database. These are merely some non-limiting illustrative embodiments of the instructions 40.

The colorized X-ray inspection image 18 received from the X-ray inspection system 10 comprises a monochrome X-ray inspection image (i.e., acquired by the X-ray scanner 12 of the X-ray inspection system 10) that is colorized in accordance with an X-ray inspection system false colorization scheme employed by the X-ray inspection system 10. The custom colorized X-ray inspection image 44 has a custom false colorization scheme that is different from the X-ray inspection system false colorization scheme. Typically, the pixel shading instructions 42 will receive or have hard-coded therein filter definitions 46 that define the filtering to be performed based on a priori knowledge of the X-ray inspection system false colorization scheme and the intended custom false colorization scheme. The X-ray inspection system false colorization scheme may be known based on published specifications of the X-ray inspection system 10. Alternatively, if such published specifications are unavailable, the X-ray inspection system false colorization scheme can be determined empirically by running test items through the X-ray inspection system 10 to generate calibration images. For example, an item composed entirely of solid metal may be run through the X-ray inspection system 10 to determine the color produced by the X-ray inspection system false colorization scheme for pure metal. Likewise, items of other materials may be scanned to determine their colors in the X-ray inspection system false colorization scheme. A scan with no item in the imaging examination volume may be performed to determine the background color produced by the X-ray inspection system false colorization scheme (or this may be determined from the background areas of calibration scans of the metal object or other items used for calibration).

The GPU 26 is a specialized electronic circuit designed to rapidly manipulate and alter memory to accelerate the creation of images in a frame buffer intended for output to a display device. The GPU 26 is designed to efficiently perform video processing, where a similar computation is made multiple times over a large data set, and where each computation could be done independently from the rest. To enable the X-ray inspection image display system 20 to support rapid production of custom colorized X-ray inspection images in a high workflow level setting such as airport passenger and checked luggage screening, the X-ray inspection image display system 20 may use the GPU 26 for a different purpose, namely, to filter the colorized X-ray inspection image 18 by performing pixel shading on the colorized X-ray inspection image 18 to generate the custom colorized X-ray inspection image 44. The GPU 26 is designed to perform pixel shading efficiently, as pixel shading is an operation that is commonly performed in video processing.

To this end, the pixel shading instructions 42 that are readable and executable by the one or more processors to filter the colorized X-ray inspection image 18 by performing pixel shading on the colorized X-ray inspection image 18 to generate a custom colorized X-ray inspection image 44 may comprise instructions generated by compiling a High-Level ShaderLanguage (HLSL) or OpenGL Shader Language (GLSL) program. There are two primary ways of programming for the GPU 26: DirectX (typically used in Windows/

Microsoft systems), where programs to be run by a GPU are written in HLSL; or OpenGL (typically used in Linux systems, for example), where programs to be run by a GPU are written in GLSL. While HLSL or GLSL are preferred due to the prevalence of the DirectX and OpenGL standards, it is alternatively contemplated for the pixel shading instructions 42 to be generated by compiling a program written in another programming language designed for a GPU.

There are many types of shaders, each with their own uses, inputs, and outputs. They also are usually arranged into a pipeline, referred to as a Graphics Pipeline. Each stage of the pipeline processes abstract information into something more concrete that the next stage can use. The last stage of the pipeline is the pixel shader, and its output is a pixel in a color space (e.g., an RGB color value, or an RGBA color space having an additional channel A indicating transparency) to be presented on a display or saved to an off-screen render target such as a bitmap image that can be saved to disk. It is noted that in OpenGL the equivalent term would be "Fragment Shader." As used herein, the term "pixel shader" is intended to encompass both pixel shaders and fragment shaders.

What inputs a pixel shader takes is up to the programmer, with some restrictions based on hardware resources, and how easily the data conforms to the types the hardware is familiar with. (For example, the GPU is typically not configured to process character string data using string operations typically used in sequential programming). Inputs can be categorized under two subtypes: uniform and varying. A uniform input is one that is constant throughout the execution of the shader while a varying input is one that will be interpolated based on the output from the previous stage in the pipeline. An example of a uniform input would be the source image. An example of a varying input would be the XY coordinates of the pixel a thread is computing for, indicating where it is on the rendering target. Combining these two inputs, each individual thread running the pixel shader will have the information required to determine the source image's color at the specific point that it is responsible for processing.

The X-ray inspection image display system 20 may leverage the GPU 26 to efficiently filter the colorized X-ray inspection image 18 by performing pixel shading on the colorized X-ray inspection image 18 to generate the custom colorized X-ray inspection image 44 having a custom false colorization scheme that is different from the X-ray inspection system false colorization scheme. One illustrative implementation of this filtering by way of pixel shading is as follows. For each pixel to be filtered of the received colorized X-ray inspection image 18, its filtered value in the custom colorized X-ray inspection image 44 is calculated as follows. The pixel to be filtered is assigned to a material of a set of materials (e.g., the set of materials: "organic," "inorganic," "metal," and "background"). In one embodiment, the filter definitions 46 stored in the non-transitory storage medium 28 include basis vectors in a color space of the X-ray inspection system false colorization scheme (e.g., an RGB color space or an RGBA color space by way of non-limiting illustrative examples) for the corresponding materials of a set of materials; and the pixel to be filtered is assigned to the material of the set of materials whose corresponding basis vector has a smallest angle respective to a pixel color vector representing the color of the pixel to be filtered in the color space of the X-ray inspection system false colorization scheme.

One way to do this is to compute, for each basis vector, a cosine of an angle between the basis vector and the pixel color vector representing the color of the pixel to be filtered, and then to assign the pixel to be filtered to the material for which the cosine of the angle between the corresponding basis vector and the pixel color vector is largest. The cosine (cos θ) of the angle θ between the basis vector $V_{basis}$ having a length $\|V_{basis}\|$ and the pixel color vector $V_{pixel}$ representing the color of the pixel to be filtered can be computed according to:

$$\cos\theta = \frac{V_{basis} \cdot V_{pixel}}{\|V_{basis}\| \times \|V_{pixel}\|} \quad (1)$$

where $V_{basis}$ is the basis vector, $V_{pixel}$ is the pixel color vector, $V_{basis} \cdot V_{pixel}$ is the dot product between the basis vector and the pixel color vector, $\|V_{basis}\|$ is the length of the basis vector, and $\|V_{pixel}\|$ is the length of the pixel color vector. (These lengths are computed as Euclidean lengths, i.e., $\|V\|=\sqrt{x^2+y^2+z^2}$ where x, y, and z are the vector coordinates of the vector V in the color space of the X-ray inspection system false colorization scheme).

The basis vectors $V_{basis}$ for the materials of the set of materials are suitably obtained from calibration images acquired by the X-ray inspection system 10 (or by another instance of an X-ray inspection system of the same make and model) of items consisting of pure examples of the specific materials, e.g., a calibration image of a metal object, a calibration image of a typical organic object, and so forth. The basis vector for background can be derived from background pixels of any of these calibration images.

After assigning the pixel to be filtered to a material of the set of materials, the pixel color vector of the pixel to be filtered is multiplied by a material-specific transformation matrix corresponding to the material to which the pixel to be filtered is assigned. The filter definitions 46 stored in the non-transitory storage medium 28 suitably include the material-specific transformation matrices for the materials of the set of materials, with each material-specific transformation matrix chosen on the basis of the type of custom false coloration desired. Optionally, the filter definitions 46 may include different filter definitions for different types of customized false coloration schemes. For example, one customized false coloration scheme may emphasize metals, while another customized false coloration scheme may emphasize a class of organic materials (e.g., a class of organic materials known to be used in explosives, in the case oaf specialized explosives detection task).

Pixel shaders typically use matrices and vectors in their calculations, which are aggregations of multiple scalar values. Usually, vectors are used to represent information with multiple dimensions, such as the coordinates of a point in two-dimensional (2D) or three-dimensional (3D) space. Additionally, vectors can be helpful for storing color information. An RGBA color value may be represented as a vector of 4 scalar values. Pixel shaders implemented by a GPU are very efficient at performing these kinds of calculations, and the HLSL and GLSL programming languages have been designed with many built-in functions that work on vectors.

In one suitable implementation of the pixel shading instructions 42 are HLSL instructions using the DirectX standard. Here, a pixel shader is suitably compiled using the FXC program provided by Microsoft as part of the Windows Software Development Kit (SDK). Compilation produces a series of bytecodes which can be embedded as a resource into the application that may then invoke it using a library or module that may set up all the other components in the graphics pipeline to apply the effect. DirectX is developed in close communication with the manufacturers of graphics cards, and to maintain compatibility separate Shader Models are issued each time features are added to HLSL. What model a computer supports depends on the model number of its video card. Video cards are backwards compatible with lower shader models but will usually not be compatible with higher shader models than the one they are designed for. Windows Presentation Foundation (WPF) is a framework for creating graphical user interfaces that incorporate graphical elements and incorporates DirectX for these processes. All of its UI elements, including the "Image" element, have an "Effect" property that can be set with a custom Pixel Shader object. WPF also makes it possible to render its UI elements to an off-screen bitmap which can be saved for use by any program or component able to use bitmap data.

If the pixel shader used is kept at a low model level, there may be limitations on what may be done in a single invocation of a shader. To address this, the functionality can be split across multiple "passes" of different shaders. For example, in some cases, in the first pass the pixels classified as Organic and Inorganic can be processed, and in the second pass, those classified as Metal and Background pixels can be processed. Then the two passes are composited to obtain the full output of the process.

In illustrative FIG. 1, the X-ray inspection image display system 20 receives the colorized X-ray inspection image 18. In a variant embodiment, if the "raw" monochrome X-ray inspection image is made available to the X-ray inspection image display system 20, then it is contemplated for the X-ray inspection image display system 20 to perform the pixel shading on the monochrome X-ray inspection image display system 20 to generate the custom colorized X-ray inspection image 44. This approach can provide a greater degree of flexibility in the custom colorization, since the X-ray inspection system false colorization scheme may introduce image artifacts or otherwise remove information contained in the raw monochrome X-ray inspection image. However, the raw monochrome X-ray inspection image may not be made available by the X-ray inspection system 10. Additionally, performing the custom colorization starting from the colorized X-ray inspection image output by the X-ray inspection system 10 can be advantageous insofar as it is based on the X-ray inspection system false colorization scheme which is likely to be familiar to security personnel.

Figure 2:
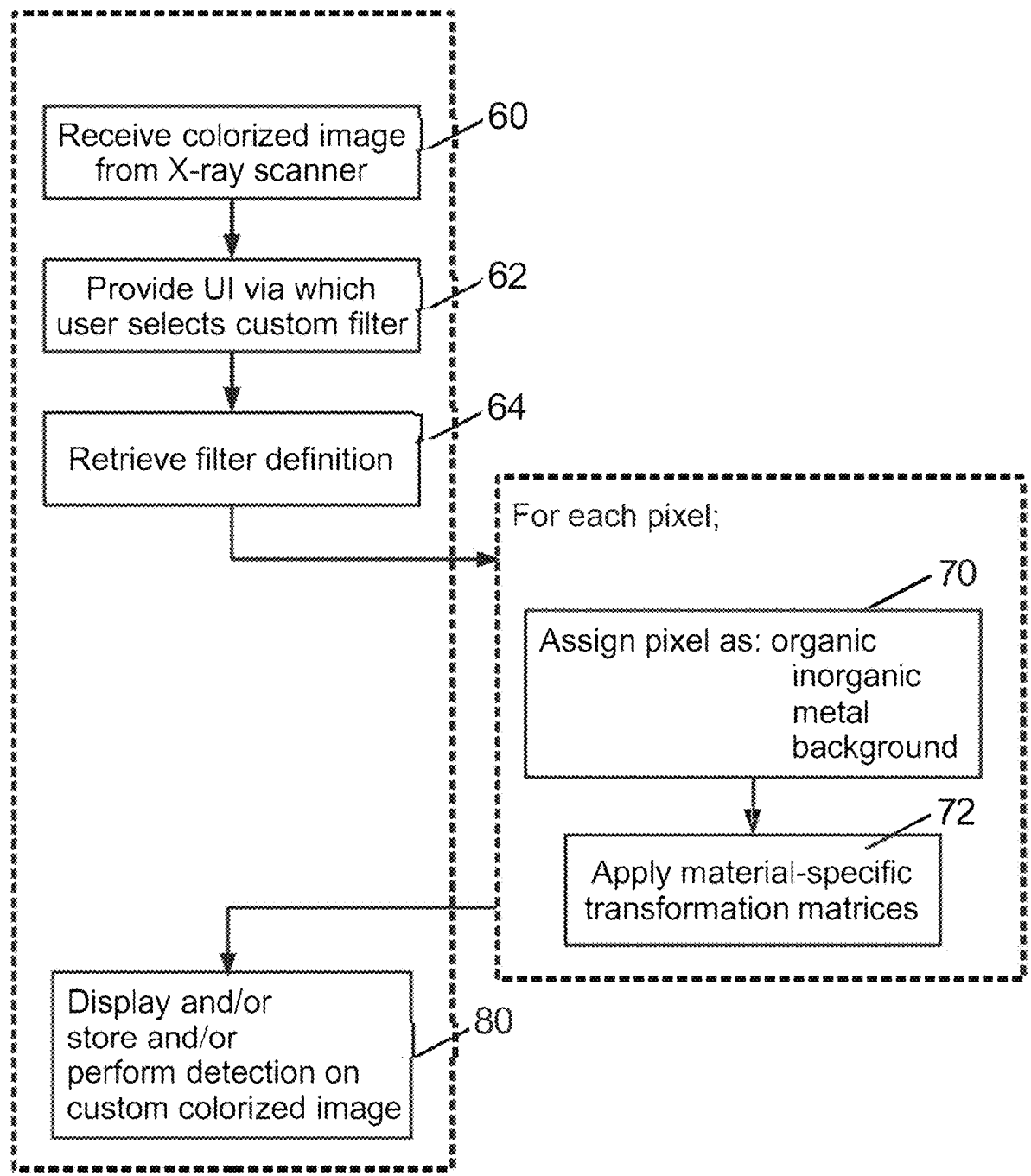
FIG. 2 diagrammatically shows an X-ray inspection process suitably performed using the X-ray inspection system of FIG. 1.

With reference now to FIG. 2, an illustrative X-ray inspection method is described. Initially, the X-ray inspection system 10 is used to acquire a monochrome X-ray image and to colorize the monochrome X-ray inspection image according to the X-ray inspection system false colorization scheme to generate the colorized X-ray inspection image 18. (These preliminary steps performed by the X-ray inspection system 10 are not illustrated in FIG. 2). Thereafter, the X-ray inspection image display system 20 is used to generate and display the custom colorized X-ray inspection image 44 having a custom false colorization scheme that is different from the X-ray inspection system false colorization scheme as follows. In an operation 60, the colorized X-ray inspection image 18 is received from the X-ray inspection system 10 by execution of the instructions 40 as previously described. In an optional operation 62 (which may be performed before or after the operation 60), a user interface (UI) is provided via which a user selects the custom filter to be applied. This may, for example, be done by UI-generating instructions (not shown) executed by the CPU 24, with the UI display being presented on the display 22 and the user employing a keyboard, mouse, touchscreen, or other user input device to select the custom filter. If operation 62 is omitted, then a pre-defined custom filter is employed. In an operation 64, the filter definitions 46 for the filter to be applied are retrieved from the non-transitory storage medium 28. These filter definitions typically include the basis vectors ($V_{basis}$) for the set of materials, and the material-specific transformation matrices.

The foregoing operations 60, 62, 64 may be performed by the CPU 24. Next, the GPU 26 may be used (by execution of the pixel shading instructions 42 by the GPU 26) to perform the filtering of the colorized X-ray inspection image 18 to generate the custom colorized X-ray inspection image 44. Specifically, in an operation 70 the pixels to be filtered are assigned to materials of the set of materials. In general, a pixel to be filtered is assigned to the material whose corresponding basis vector $V_{basis}$ has the smallest angle respective to the pixel color vector $V_{pixel}$ of the pixel to be filtered. In one approach for determining this, the pixel to be filtered is assigned to the material for which cos θ given in Equation (1) is largest (thereby corresponding to the smallest angle). In an operation 72, the material-specific transformation matrices are applied to the pixels to be filtered in accordance with their assigned materials.

The output of the operations 70, 72 is the custom colorized X-ray inspection image 44. In an operation 80, the custom colorized X-ray inspection image 44 is suitably presented on the display 22. In some embodiments, the custom colorized X-ray inspection image 44 is displayed by itself. In other embodiments, the custom colorized X-ray inspection image 44 is presented on the display 22 together with the (original) colorized X-ray inspection image 18 output by the X-ray inspection system 10. An advantage of this latter approach is that security personnel may be very familiar with reading images colorized in accordance with the X-ray inspection system false colorization scheme (such as colorized X-ray inspection image 18); whereas the custom colorized X-ray inspection image 44 may be colorized in accordance with a custom false colorization scheme that more strongly highlights materials of particular interest.

Additionally or alternatively, in the operation 80 the custom colorized X-ray inspection image 44 may be stored in the non-transitory storage medium 28. Additionally or alternatively, in the operation 80 the custom colorized X-ray inspection image 44 may apply an object detection algorithm to the custom colorized X-ray inspection image 44 in order to detect objects made of material(s) that are strongly highlighted by the custom false coloration scheme. These are merely non-limiting illustrative examples of some ways the custom colorized X-ray inspection image 44 may be utilized.

With reference now to FIGS. 3-5, some illustrative High Level Shader Language (HLSL) programs and data structures are shown, which provide further illustrative embodiments of the pixel shading instructions 42 and filter definitions 46.

FIG. 3 illustrates an implementation of Equation (1) in HLSL.

FIG. 4 illustrates definitions in HLSL of the basis vectors $V_{basis}$ for an example in which the set of materials includes four materials: organic materials, inorganic materials, metals, and background. This may be suitably part of the filter definitions 46. It should be noted that while FIG. 4 illustrates an example in which the set of materials includes four materials, the set of materials may include any number of materials as would be apparent to one skilled in the art.

FIG. 5 illustrates an example of HLSL code for implementing the operation 70 of FIG. 2, and which is suitably a portion of the pixel shading instructions 42. The approach of FIG. 5 successively computes cos θ with respect to the organic material basis vector, the inorganic material basis vector, the metals basis vector, and the background basis vector. Initially, the variable max Cos Theta is assigned the cos θ value computed respective to the organic material basis vector and the variable out Color is set to "organic." For each subsequent material (inorganic, metal, background in that order), if the computed cos θ value is larger than the current value of max Cos Theta then max Cos Theta is set to the new (larger) computed cos θ0) value and out Color is set accordingly. The output of the code shown in FIG. 5 is out Color, which is the material assigned for the pixel. However, FIG. 5 provides only an illustration of one implementation and does not imply any limitations with regard to the environments in which different embodiments may be implemented. Many modifications to the depicted environment may be made by those skilled in the art without departing from the scope of the disclosure as recited by the claims.

In the foregoing, the X-ray inspection image display system 20 is described as being deployed "in the field", e.g. at an airport screening station, railroad station screening station, secure building screening station, or so forth, in order to provide custom colorized X-ray inspection images having a custom false colorization scheme that is different from the X-ray inspection system false colorization scheme, and that is preferably designed to highlight material(s) of particular interest.

In other contemplated applications, the X-ray inspection image display system 20 may be used in other ways, such as to provide assistance in training security personnel to recognize contraband or security threats detected by the X-ray inspection system 10. In an example of such training, the security person under training may review a colorized-ray inspection image produced by the X-ray inspection system 10, with the expectation that the security person will recognize a contraband or security threat item in the image. After reviewing the image, the X-ray inspection image display system 20 is applied to generate a custom colorized X-ray inspection image that is designed to highlight the contraband or security threat item that is to be recognized. In one approach, the security person can toggle between showing the original colorized X-ray inspection image produced by the X-ray inspection system 10 and the custom colorized X-ray inspection image produced by the X-ray inspection image display system 20 or may show these two images side-by-side (or above/below), so that the security person can better perceive the contraband or security threat item that is to be recognized.

According to one aspect of the present disclosure, there is thus provided a system for X-ray inspection image display. The system includes: one or more processors; one or more non-transitory computer readable storage media: and program instructions stored on the one or more non-transitory computer readable storage media for execution by at least one of the one or more processors. The stored program instructions include instructions to: the program instructions including instructions to: receive a colorized X-ray inspection image comprising a monochrome X-ray inspection image that is colorized in accordance with an X-ray inspection system false colorization scheme; and filter the colorized X-ray inspection image by performing pixel shading on the colorized X-ray inspection image to generate a custom colorized X-ray inspection image having a custom false colorization scheme that is different from the X-ray inspection system false colorization scheme.

According to another aspect of the present disclosure, there is thus provided a system for X-ray inspection image display. The system includes: an X-ray inspection image display system; and an X-ray inspection system including an X-ray scanner and an X-ray inspection system computer programmed to colorize a monochrome X-ray inspection image acquired by the X-ray scanner according to an X-ray inspection system false colorization scheme to generate a colorized X-ray inspection image; where the X-ray inspection image display system and the X-ray inspection system are operatively connected, and the X-ray inspection image display system is configured to receive the colorized X-ray inspection image by instructions that are readable and executable by one or more processors to receive the colorized X-ray inspection image.

According to yet another aspect of the disclosure, there is provided a computer-implemented method for X-ray inspection. The computer-implemented method includes: receiving, by one or more processors, a colorized X-ray inspection image comprising a monochrome X-ray inspection image that is colorized in accordance with an X-ray inspection system false colorization scheme; and filtering, by the one or more processors, the colorized X-ray inspection image on an X-ray inspection image display system by performing pixel shading on the colorized X-ray inspection image to generate a custom colorized X-ray inspection image having a custom false colorization scheme that is different from the X-ray inspection system false colorization scheme.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present disclosure may be a system, and/or method. The system may include one or more non-transitory computer readable storage media having computer readable program instructions thereon for causing a processor to carry out aspects of the present disclosure.

The non-transitory computer readable storage media can be any tangible device that can retain and store instructions for use by an instruction execution device. The non-transitory computer readable storage media may be, for example, but is not limited to, an electronic storage device, a magnetic storage device, an optical storage device, an electromagnetic storage device, a semiconductor storage device, or any suitable combination of the foregoing. A non-transitory computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a non-transitory computer readable storage media or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a non-transitory computer readable storage media within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or other programmable logic devices (PLD) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, and apparatus (systems) according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

The preferred embodiments have been illustrated and described. Obviously, modifications and alterations will occur to others upon reading and understanding the preceding detailed description. It is intended that this disclosure be construed as including all such modifications and alterations insofar as they come within the scope of the appended claims or the equivalents thereof.

What is claimed is:

1. A system for X-ray inspection image display comprising:
    one or more processors;
    one or more non-transitory computer readable storage media: and
    program instructions stored on the one or more non-transitory computer readable storage media for execution by at least one of the one or more processors, the program instructions including instructions to:
        receive a colorized X-ray inspection image comprising a monochrome X-ray inspection image that is colorized in accordance with an X-ray inspection system false colorization scheme; and
        filter the colorized X-ray inspection image by performing pixel shading on the colorized X-ray inspection image to generate a custom colorized X-ray inspection image having a custom false colorization scheme that is different from the X-ray inspection system false colorization scheme.

2. The system of claim 1, wherein the one or more processors are chosen from a group consisting of Central Processing Units (CPUs), Graphics Processing Units (GPUs), or combinations thereof.

3. The system of claim 1, further comprising a display operatively connected with the one or more processors and configured to present the custom colorized X-ray inspection image.

4. The system of claim 1, wherein the program instructions including instructions to filter the colorized X-ray inspection image by performing pixel shading on the colorized X-ray inspection image to generate a custom colorized X-ray inspection image having a custom false colorization scheme that is different from the X-ray inspection system false colorization scheme further comprises one or more of the following program instructions, stored on the one or more non-transitory computer readable storage media, to:
for each pixel of a plurality of pixels of the colorized X-ray inspection image to be filtered:
determine a pixel color vector for each pixel;
calculate an angle between the pixel color vector and a basis vector for each material of a set of materials in a color space of the X-ray inspection system false colorization scheme;
determine a material having a smallest angle between the pixel color vector and the basis vector for the material; and
assign each pixel of the plurality of pixels of the colorized X-ray inspection image to be filtered to the material having the smallest angle between the pixel color vector and the basis vector for the material.

5. The system of claim 4, wherein the one or more non-transitory computer readable storage media stores the basis vector for each material of the set of materials in the color space of the X-ray inspection system false colorization scheme including:
an organic material basis vector corresponding to organic materials in the color space of the X-ray inspection system false colorization scheme,
an inorganic material basis vector corresponding to inorganic materials in the color space of the X-ray inspection system false colorization scheme,
a metals basis vector corresponding to metal materials in the color space of the X-ray inspection system false colorization scheme, and
a background basis vector corresponding to a background in the color space of the X-ray inspection system false colorization scheme.

6. The system of claim 4, wherein the program instructions including instructions to filter the colorized X-ray inspection image by performing pixel shading on the colorized X-ray inspection image to generate a custom colorized X-ray inspection image having a custom false colorization scheme that is different from the X-ray inspection system false colorization scheme further comprises one or more of the following program instructions, stored on the one or more non-transitory computer readable storage media, to:
for each basis vector:
compute a cosine of an angle between the basis vector and the pixel color vector representing a color of each pixel of the plurality of pixels of the colorized X-ray inspection image to be filtered; and
assign a pixel to be filtered to a material for which the cosine of the angle between a corresponding basis vector and the pixel color vector is largest.

7. The system of claim 6, wherein the cosine of the angle between the basis vector and the pixel color vector is computed according to:

$$\cos\theta = \frac{V_{basis} \cdot V_{pixel}}{\|V_{basis}\| \times \|V_{pixel}\|}$$

wherein $V_{basis}$ is the basis vector, $V_{pixel}$ is the pixel color vector, $V_{basis} \cdot V_{pixel}$ is a dot product between the basis vector and the pixel color vector, $\|V_{basis}\|$ is a length of the basis vector, and $\|V_{pixel}\|$ is a length of the pixel color vector.

8. The system of claim 4, wherein the program instructions including instructions to filter the colorized X-ray inspection image by performing pixel shading on the colorized X-ray inspection image to generate a custom colorized X-ray inspection image having a custom false colorization scheme that is different from the X-ray inspection system false colorization scheme further comprises:
multiplying, by the one or more processors, the pixel color vector of a pixel to be filtered by a material-specific transformation matrix corresponding to a material to which the pixel to be filtered is assigned,
wherein the material-specific transformation matrix corresponding to each material is stored on the one or more non-transitory computer readable storage media.

9. A customized system for X-ray inspection image display comprising:
an X-ray inspection image display system comprising:
one or more processors; and
one or more non-transitory computer readable storage media; and
an X-ray inspection system including an X-ray scanner and an X-ray inspection system computer programmed to colorize a monochrome X-ray inspection image acquired by the X-ray scanner according to an X-ray inspection system false colorization scheme to generate a colorized X-ray inspection image;
wherein the X-ray inspection image display system and the X-ray inspection system are operatively connected, and the X-ray inspection image display system is configured to receive the colorized X-ray inspection image by instructions that are readable and executable by the one or more processors to receive the colorized X-ray inspection image.

10. The customized system of claim 9, wherein the one or more processors are chosen from a group consisting of Central Processing Units (CPUs), Graphics Processing Units (GPUs), or combinations thereof.

11. The customized system of claim 9, further comprising one or more of the following program instructions, stored on the one or more non-transitory computer readable storage media, to:
receive the colorized X-ray inspection image from the X-ray inspection system; and
filter the colorized X-ray inspection image by performing pixel shading on the colorized X-ray inspection image to generate a custom colorized X-ray inspection image having a custom false colorization scheme.

12. The customized system of claim 11, wherein:
the X-ray inspection image received from the X-ray inspection system is a colorized X-ray inspection image comprising a monochrome X-ray inspection image that is colorized in accordance with an X-ray inspection system false colorization scheme; and the custom colorized X-ray inspection image having a custom false colorization scheme, which is different from the X-ray inspection system false colorization scheme.

13. The customized system of 11, wherein the program instructions including instructions to filter the colorized X-ray inspection image by performing pixel shading on the colorized X-ray inspection image to generate a custom colorized X-ray inspection image having a custom false colorization scheme, further comprising one or more of the following program instructions, stored on the one or more non-transitory computer readable storage media, to:
   for each pixel of a plurality of pixels of the colorized X-ray inspection image to be filtered:
      for each basis vector, compute a cosine of an angle θ between a basis vector $V_{basis}$ having a length $\|V_{basis}\|$ and a pixel color vector $V_{pixel}$ representing a color of the pixel to be filtered and having a length $\|V_{pixel}\|$ according to:

$$\cos\theta = \frac{V_{basis} \cdot V_{pixel}}{\|V_{basis}\| \times \|V_{pixel}\|}$$

wherein $V_{basis} \cdot V_{pixel}$ is a dot product between the basis vector and the pixel color vector; and
   assigning the pixel to be filtered to a material of a set of materials for which cos θ is largest.

14. The customized system of claim 9, further comprising one or more of the following program instructions, stored on the one or more non-transitory computer readable storage media, to:
   for each pixel of a plurality of pixels of the colorized X-ray inspection image to be filtered:
      determine a pixel color vector for each pixel;
      calculate an angle between the pixel color vector and a basis vector for each material of a set of materials in a color space of the X-ray inspection system false colorization scheme;
      determine a material having a smallest angle between the pixel color vector and the basis vector for the material; and
      assign each pixel of the plurality of pixels of the colorized X-ray inspection image to be filtered to the material having the smallest angle between the pixel color vector and the basis vector for the material.

15. A computer-implemented method for an X-ray inspection, the computer-implemented method comprising:
   receiving, by one or more processors, a colorized X-ray inspection image comprising a monochrome X-ray inspection image that is colorized in accordance with an X-ray inspection system false colorization scheme; and
   filtering, by the one or more processors, the colorized X-ray inspection image on an X-ray inspection image display system by performing pixel shading on the colorized X-ray inspection image to generate a custom colorized X-ray inspection image having a custom false colorization scheme that is different from the X-ray inspection system false colorization scheme.

16. The computer-implemented method of claim 15, wherein the custom colorized X-ray inspection image is displayed on a display of the X-ray inspection image display system.

17. The computer-implemented method of claim 15, wherein filtering the colorized X-ray inspection image on the X-ray inspection image display system by performing pixel shading on the colorized X-ray inspection image to generate the custom colorized X-ray inspection image having the custom false colorization scheme that is different from the X-ray inspection system false colorization scheme further comprises:
   for each pixel of a plurality of pixels of the colorized X-ray inspection image to be filtered:
      determining, by the one or more processors, a pixel color vector for each pixel;
      calculating, by the one or more processors, an angle between the pixel color vector and a basis vector for each material of a set of materials in a color space of the X-ray inspection system false colorization scheme;
      determining, by the one or more processors, a material having a smallest angle between the pixel color vector and the basis vector for the material; and
      assigning, by the one or more processors, each pixel of the plurality of pixels of the colorized X-ray inspection image to be filtered to the material having the smallest angle between the pixel color vector and the basis vector for the material.

18. The computer-implemented method of claim 15, wherein filtering the colorized X-ray inspection image on the X-ray inspection image display system by performing pixel shading on the colorized X-ray inspection image to generate the custom colorized X-ray inspection image having the custom false colorization scheme that is different from the X-ray inspection system false colorization scheme further comprises:
   for each pixel of a plurality of pixels of the colorized X-ray inspection image to be filtered:
      computing, by the one or more processors, a cosine of an angle θ between a basis vector $V_{basis}$ having a length $\|V_{basis}\|$ and a pixel color vector $V_{pixel}$ representing a color of a pixel to be filtered and having a length $\|V_{pixel}\|$ for each basis vector according to:

$$\cos\theta = \frac{V_{basis} \cdot V_{pixel}}{\|V_{basis}\| \times \|V_{pixel}\|}$$

wherein $V_{basis} \cdot V_{pixel}$ is a dot product between the basis vector and the pixel color vector; and
   assigning, by the one or more processors, the pixel to be filtered to a material of a set of materials in a color space of the X-ray inspection system false colorization scheme for which cos θ is largest.

19. The computer-implemented method of claim 15, further comprising:
   for each pixel of a plurality of pixels of the colorized X-ray inspection image to be filtered:
      multiplying, by the one or more processors, a pixel color vector of a pixel to be filtered by a material-specific transformation matrix corresponding to a material to which the pixel to be filtered is assigned.

20. The computer-implemented method of claim 15, wherein the X-ray inspection image display system is separate from an X-ray inspection system and the colorized X-ray inspection image is received at the X-ray inspection image display system from the X-ray inspection system via one of:
   a wired data communication cable connecting the X-ray inspection image display system with the X-ray inspection system, or a wireless data communication channel wirelessly connecting the X-ray inspection image display system with the X-ray inspection system, or a data communication network with which both the X-ray inspection image display system and the X-ray inspection system are connected either wirelessly or via a wired data communication cable.

* * * * *